United States Patent
Belmonte

(10) Patent No.: US 7,959,408 B2
(45) Date of Patent: Jun. 14, 2011

(54) DEVICE FOR ATTACHING A STATOR VANE TO A TURBOMACHINE ANNULAR CASING, TURBOJET ENGINE INCORPORATING THE DEVICE AND METHOD FOR MOUNTING THE VANE

(75) Inventor: Olivier Belmonte, Savigny le Temple (FR)

(73) Assignee: SNECMA, Paris (FR)

( * ) Notice: Subject to any disclaimer, the term of this patent is extended or adjusted under 35 U.S.C. 154(b) by 930 days.

(21) Appl. No.: 11/861,873

(22) Filed: Sep. 26, 2007

(65) Prior Publication Data

US 2008/0075588 A1 Mar. 27, 2008

(30) Foreign Application Priority Data

Sep. 26, 2006 (FR) ...................................... 06 53952

(51) Int. Cl.
*F01D 9/04* (2006.01)
(52) U.S. Cl. ................. 415/209.3; 415/213.1; 29/889.21
(58) Field of Classification Search ............... 415/209.3, 415/213.1; 29/889.21, 889.22
See application file for complete search history.

(56) References Cited

U.S. PATENT DOCUMENTS

| 5,584,654 A * | 12/1996 | Schaefer et al. | 415/209.3 |
| 6,234,750 B1 * | 5/2001 | Mielke et al. | 415/189 |
| 6,652,228 B2 * | 11/2003 | Tiemann | 415/178 |
| 7,481,618 B2 * | 1/2009 | Booth et al. | 415/191 |
| 2004/0062652 A1 | 4/2004 | Grant et al. | |

FOREIGN PATENT DOCUMENTS

| EP | 0 953 729 A1 | 11/1999 |
| EP | 1 167 693 A2 | 1/2002 |
| EP | 1 219 785 A1 | 7/2002 |
| FR | 2 832 179 A1 | 5/2003 |

* cited by examiner

*Primary Examiner* — Ninh H Nguyen
(74) *Attorney, Agent, or Firm* — Oblon, Spivak, McClelland, Maier & Neustadt, L.L.P.

(57) ABSTRACT

The present invention relates to a device for attaching a turbomachine stator vane in an annular casing (20) of the turbomachine, the vane comprising a tip formed of a platform (14) with two edges (141, 142), one of them forming an upstream edge (141) and the other forming a downstream edge (142), an airfoil (11) and a root (13), the annular casing (20) comprising a circumferential groove (23) formed in its interior wall with an upstream flank (21) and a downstream flank (22), the vane being held by engagement of the platform (14) in the groove (23), the upstream edge against the upstream flank (21) and the downstream edge (142) against the downstream flank (22) of the groove (23), the downstream flank (22) of the groove (23) being in the form of a slot (22) opening axially in the upstream direction, the downstream edge of the platform (23) being engaged in said downstream flank (22) and a fastening means (40) being attached in order to hold the platform (14) in the groove on the upstream side, wherein the vane comprises a portion of platform (14) between the airfoil (11) and the upstream edge, this portion being pierced with a through-hole (17) designed to accept said fastening means (40).

10 Claims, 3 Drawing Sheets

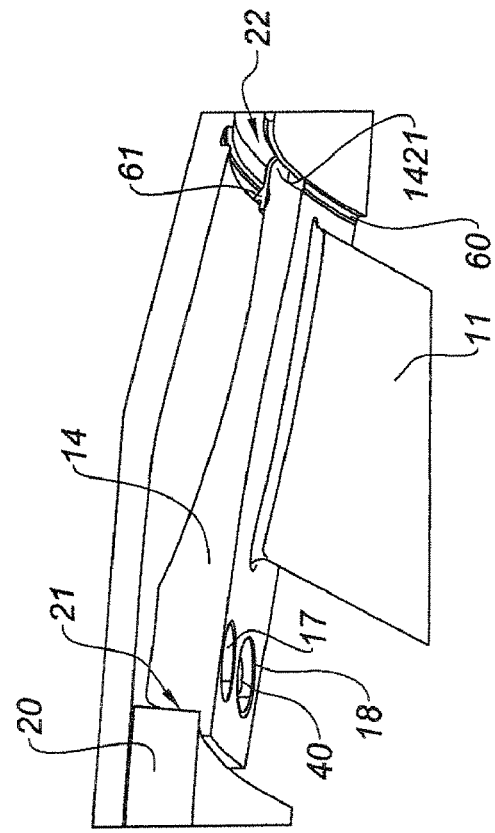
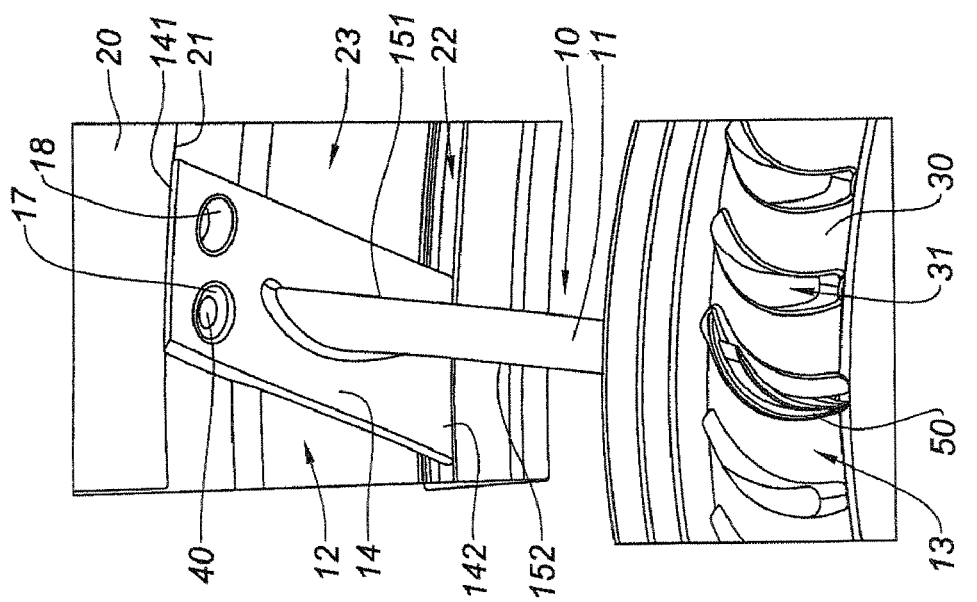

DEVICE FOR ATTACHING A STATOR VANE TO A TURBOMACHINE ANNULAR CASING, TURBOJET ENGINE INCORPORATING THE DEVICE AND METHOD FOR MOUNTING THE VANE

BACKGROUND OF THE INVENTION

The present invention relates to the field of turbomachines, particularly bypass turbojet engines.

A bypass turbojet engine for propelling transport airplanes comprises a fan, generally an upstream fan, delivering an annular air stream with a main, central, annular part, which is fed into the engine that drives the fan, and a bypass, outer, annular part which is discharged into the atmosphere providing a significant proportion of the thrust. The fan is contained in a fan casing externally delimiting the bypass stream. A main stream casing separates the primary stream from the bypass stream at a separation nose.

The present invention is concerned with the attachment and mounting of stator fins or flow-straightening vanes positioned downstream of the fan.

DESCRIPTION OF THE PRIOR ART

The mounting of flow-straightening vanes in a turbojet engine is a technique that has been mastered for medium-sized engines, such as engines of the CFM type. This mounting technique is traditionally known as an "encastré/supported" type of mounting. It is used for mounting flow-straightening vanes, for example, in the bypass stream, between the fan casing and the main stream casing in order to straighten the bypass stream so that it is along the axis of the engine, as depicted in FIG. 1.

In the context of an application such as this, the stator vane comprises a tip formed of a platform with two edges, one of them forming an upstream edge and the other forming a downstream edge, an airfoil and a root. The fan casing comprises a circumferential groove, formed in its interior wall, with an upstream flank and a downstream flank, the vane tip being held by engagement of the platform in the groove. The platform is held in the groove by means of two fixing screws which are screwed into the platform, one on each side of the flanks of the airfoil, as depicted in FIG. 1. At the other end of the airfoil, the root of the vane is held by engagement in an opening formed in the main stream casing.

For medium-sized engines, the radial size of the engine is sufficient for a technician to be able to maneuver the vanes between the main stream casing and the fan casing, that is to say pivot them and move them in a translational movement without the risk of knocking against the casing or against a vane that has already been installed. The vanes are accessible "from behind", that is to say downstream of the vanes in the bypass stream, making maintenance operations and the replacement of worn vanes easier.

By comparison with a medium-sized engine, for a given number of vanes, the linear density of the vanes at the periphery of the fan casing is higher on a small-sized engine, the angular density remaining the same. This has a number of consequences in terms of the attachment of the stator vanes.

The platforms, the peripheral size of which needs to be large in order to accommodate the fixing screws, are close together at the periphery of the casing. It is therefore difficult to insert the vanes into the engine, particularly when engaging the vane in the groove in the fan casing, there being a restricted amount of space for transverse movement. The platform fixing screws, positioned one on each side of the flanks of the airfoil, are engaged between two adjacent airfoils, making them difficult to access with screw-tightening equipment.

SUMMARY OF THE INVENTION

It is an object of the invention to alleviate these disadvantages and to propose a device for attaching and a method for mounting the stator vanes in an annular casing that allows the vanes to be inserted into the casing quickly and held in place in a simple way.

To this end, the applicant company is proposing a device for attaching a turbomachine stator vane in an annular casing of the turbomachine, the vane comprising a tip formed of a platform with two edges, one of them forming an upstream edge and the other forming a downstream edge, an airfoil and a root, the annular casing comprising a circumferential groove formed in its interior wall with an upstream flank and a downstream flank, the vane being held by engagement of the platform in the groove, the upstream edge against the upstream flank and the downstream edge against the downstream flank of the groove, the downstream flank of the groove being in the form of a slot opening axially in the upstream direction, the downstream edge of the platform being engaged in said downstream flank and a fastening means being attached in order to hold the platform in the groove on the upstream side, wherein the vane comprises a portion of platform between the airfoil and the upstream edge, this portion being pierced with a through-hole designed to accept said fastening means.

Advantageously, the downstream flank of the groove does not need any attached fastening means, thus making it easier to insert the vane into the casing and hold it there. A fastening means is attached only upstream of the airfoil thus allowing the vanes to be attached from the front end of the engine rather than on each side of the airfoils. The fastening means are then readily accessible to fastening tools, allowing the platform to be attached to the groove more quickly.

As a preference, the fastening means consists of one screw or two screws.

Advantageously, one or two screws are engaged near the upstream edge of the platform in order to hold the latter in the groove. The ease of access to the screws from the upstream side allows screw-tightening equipment to be maneuvered with ease.

As a preference, a layer of elastomeric material is positioned between the downstream edge of the platform and the bottom of said slot.

Advantageously, the elastomeric material damps the deflection of the vane from the upstream to the downstream side when the air stream from the fan is being straightened by the vane.

The invention also relates to a bypass turbojet engine with upstream fan with a set of stator vanes which straighten the stream downstream of the fan rotor and the vanes of which are held inside the fan casing by the device of the invention.

As a preference, the vanes are positioned between the fan casing and the main stream casing, the root of the vanes being engaged with clearance in openings formed in said main stream casing and a seal being used to fill said clearance.

Advantageously, the clearance is filled with a seal so as to prevent the air stream from rushing into the main stream casing.

As a preference, the vanes and the main stream casing are made of a metal or of a composite.

The invention also relates to the method of mounting the vanes of the assembly, whereby the vane is engaged via the root in said opening, the vane is tilted in such a way as to engage the downstream edge of the platform in the downstream slot of the circumferential groove, the vane is pivoted about the slot, returning the vane upstream until the upstream edge of the platform enters the groove, and the platform is secured to the casing using the fastening means.

Advantageously, this mounting method allows vanes to be mounted between the fan casing and the main stream casing with a limited number of transverse movements of the vanes with respect to the axis of the engine, and encouraging radial movements.

As a preference, a seal is fitted around the airfoil near the root beforehand.

Advantageously, there is no need to tilt the vane when mounting it in order to insert the seal, the vane being inserted with the seal already slipped on to the airfoil.

As a preference, a layer of elastomeric material is positioned between the downstream edge of the platform and the bottom of the slot.

Advantageously, the layer of elastomeric material is set in place before the vane is inserted, in order to damp its deflection.

BRIEF DESCRIPTION OF THE DRAWINGS

The invention will be better understood with the aid of the following description with reference to the attached drawing, in which:

FIG. 2 depicts a perspective view of the vane held in an annular casing according to the invention;

FIG. 3 depicts a perspective view of the attachment of the platform of the vane to a fan casing according to the invention;

DESCRIPTION OF THE PREFERRED EMBODIMENTS

Figure 1:
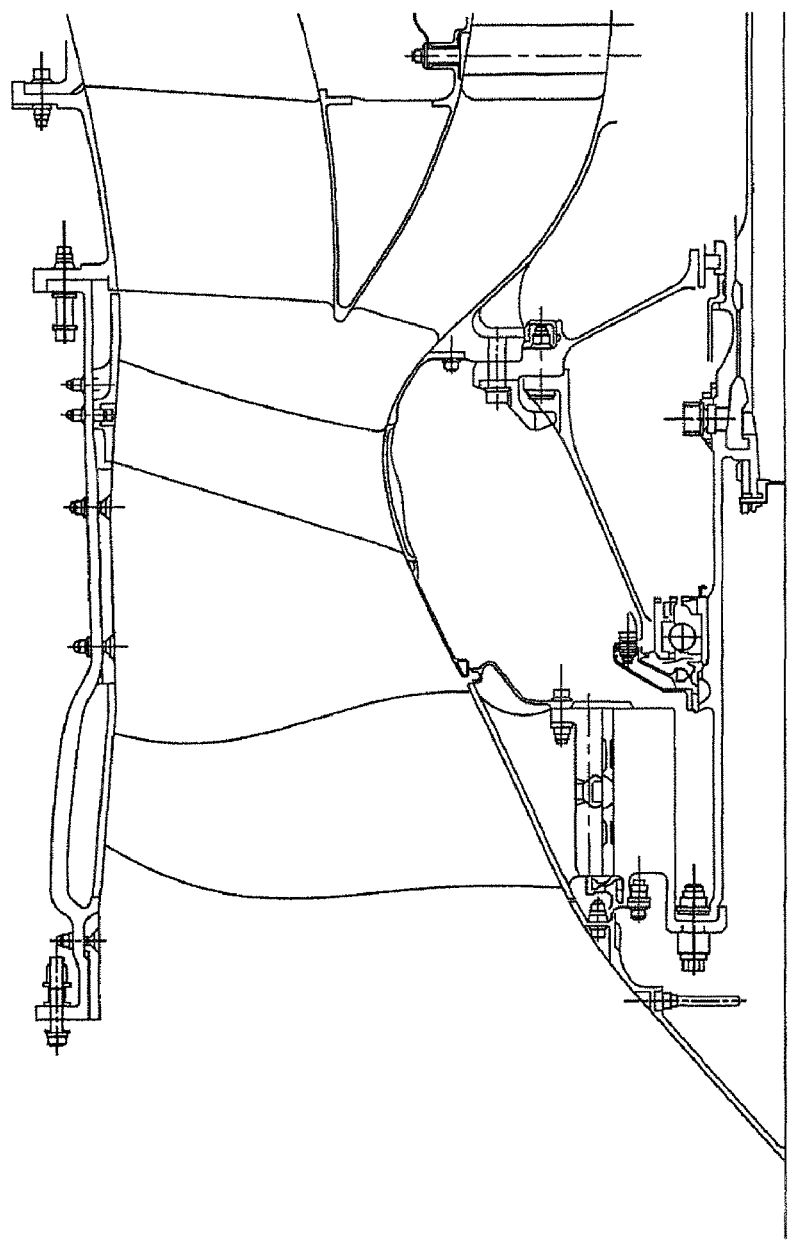
FIG. 1 depicts a section view of a turbojet engine with flow-straightening vanes, downstream of the fan, attached using a fastening device of the prior art.

With reference to FIG. 2, a stator vane 10, or flow-straightening vane 10, here is installed in the duct of the bypass stream of a bypass turbojet engine, downstream of a fan, between a fan casing 20 and a main stream casing 30. The vane 10 comprises a tip 12 formed of a platform 14 with two edges, an upstream edge 141 and a downstream edge 142, an airfoil 11 and a root 13. The vanes 10 and the main stream casing 30 here are made of metal, but they could equally be made of a composite.

The vane 10 is positioned radially in the stream, the root 13 directed toward the axis of the engine, the airfoil 11 comprising a leading edge 151 and a trailing edge 152, the platform 14 being substantially perpendicular to the airfoil 11.

The platform 14 here is formed of a parallelepipedal block the thickness of which decreases between the upstream edge 141 and the downstream edge 142, the upstream edge 141 ending at its upstream end in a step 1411 formed on the face of the platform in contact with the casing 20, this step 1411 making it easier to insert the platform 14 in said casing 20. The downstream edge has a portion of rounded shape 1421. The platform 14 is pierced with two through-holes 17, 18 positioned at a portion of platform between the upstream edge 141 and the airfoil 11. The holes 17, 18 are each designed to accept a fastening means 40.

The fan casing 20 comprises a circumferential groove 23 formed in its interior wall and into which the platform 14 is inserted. The groove 23 comprises an upstream flank 21 and a downstream flank 22. The downstream flank 22 has the shape of a slot with a circular cross section open axially in the upstream direction. The vane 10 is held by engagement of its platform 14 into the groove 23, the upstream edge 141 against the upstream flank 21 and the downstream edge 142 against the downstream flank 22 of the groove 23. The rounded portion 1421 of the downstream edge 142 collaborates with the slot 22. There is a clearance left between the upstream flank 141 and the upstream edge 21 to make it easier to insert the platform 14 into the groove 23.

A layer of damping elastomeric material 60 is positioned between the downstream edge 142 of the platform 14 and the bottom of said slot 22. The elastomer 60 is able to limit the deflection of the vane 10 when it is subjected to the fluctuations of the air stream from the fan. The layer of elastomeric material 60 comprises an immobilizing tab 61 projecting radially and collaborating with an indentation 25 made in the interior wall of the groove 23 in the vicinity of the slot 22, the tab 61 holding the elastomeric layer 60 in the bottom of the slot 22.

Figure 4:
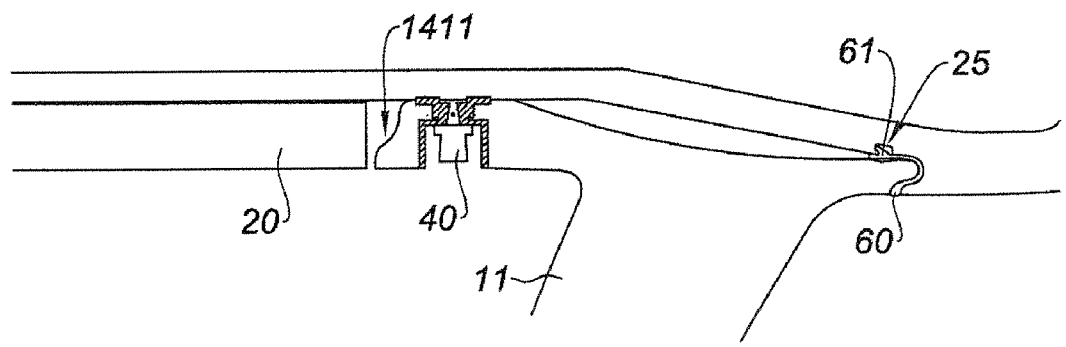
FIG. 4 depicts a section view of the attachment of the vane to the fan casing according to the invention.

The platform 14 is held in the groove 23 by means of screws 40 passing through the holes 17, 18, as depicted in FIG. 3. With reference to FIG. 4, two screws 40 here are engaged in the upstream edge 141 in order to hold the tip 12 of the vane 12 in position.

Figure 5:
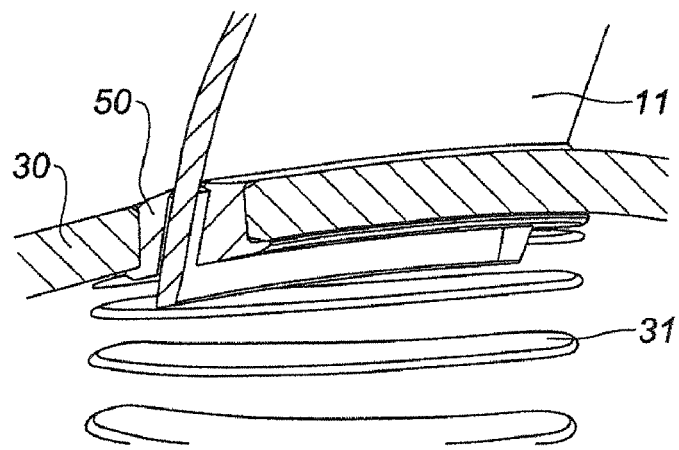
FIG. 5 depicts a schematic view of the vane root engaged in an opening in the primary casing according to FIG. 2.

At the other end of the vane 10, the root 13 is engaged with clearance in a through-hole 31 made in the main stream casing 30, as depicted in FIG. 5. A seal 50 of annular shape is slipped over the airfoil 11 at the root 13 thus rendering the engagement of the vane 10 in the casing 30 airtight.

The stator vanes 10 can thus be mounted from the front.

First of all, the elastomeric seal 60 is inserted into the downstream slot 22 and held in place with the radially projecting tab 61 projecting into the indentation 25 of the groove 23. The elastomer 60 is therefore secured into the bottom of the slot 22.

The annular seal 50 is then slipped over the airfoil 11 via the root 13 of the vane 10 which is fitted higher up than its final position in order not to clutter the end of the root 13 of the vane 10.

The vane 10 is then offered up at an angle into the through-hole 31 in the main stream casing 30, with the root 13 pointing downstream and the seal 50 higher up along the airfoil 11. The root is pushed further downstream than the position it will ultimately occupy in said casing 30, in order to retain some clearance for straightening the vane 10.

The tip 12 of the vane 10 is then straightened up by moving it in the downstream direction, the root 13 being guided in the opening 31, the rounded portion 1421 of the downstream edge being inserted in the slot 22 of the groove 23, the slot 22 having already been covered with the layer of elastomer 60.

The vane 10 is then pivoted about the slot 22, returning the vane 10 in the upstream direction until the upstream edge 141 of the platform 14 comes into contact with the bottom of the groove 23, the clearance left between the upstream flank 21 and the upstream edge 141 making it easier to insert the platform 14 into the groove 23.

The annular seal 50 is then slid along the airfoil 11, the seal 50 filling the clearance between the vane 10 and the hole 31. The seal 50, here made of an elastomeric material, may be compressed as it is inserted, the seal 50 relaxing once it is in position between the vane 10 and the opening 30, thus making the engagement of the vane 10 in the casing 20 airtight.

Finally, the platform 14 is secured to the casing 20 by screwing the screws 40 into the upstream edge 141 of the platform 14 to hold it in the groove 23. The screws are tightened using screw-tightening tools, the upstream edge 141 being readily accessible from the upstream side of the engine.

In another approach, before sliding the seal 50 into a lowered sealing position, the screws 40 may also be screwed partially into the platform 14 in order to maintain some clearance as the seal 50 is fitted. When the seal 50 is in place, attachment of the platform 14 to the groove 23 is completed, the assembly then being safe.

During operation, air from the fan is straightened along the axis of the turbojet engine, the seal 50 preventing the air from rushing into the main stream casing 30 and the layer of elastomer 60 damping the deflection of the vane 10.

When a vane 10 is damaged, it can easily be replaced by performing the mounting steps in reverse order, it being easy for the elastomer 60 to be replaced should it prove to be worn.

The methods for mounting and removing a vane 10 as described are highly suitable for engines with a high linear vane density at the circumference of the casing 20. These methods, therefore, are particularly well-suited to small-sized engines in which the vanes 10 are very close together.

The invention claimed is:

1. A device for attaching a turbomachine stator vane in an annular casing of the turbomachine, the vane comprising a tip formed of a platform with two edges, one of them forming an upstream edge and the other forming a downstream edge, an airfoil and a root, the annular casing comprising a circumferential groove formed in its interior wall with an upstream flank and a downstream flank, the vane being held by engagement of the platform in the groove, the upstream edge against the upstream flank and the downstream edge against the downstream flank of the groove, the downstream flank of the groove being in the form of a slot opening axially in the upstream direction, the downstream edge of the platform being engaged in said downstream flank and a fastening means being attached in order to hold the platform in the groove on the upstream side, wherein the vane comprises a portion of platform between the airfoil and the upstream edge, this portion being pierced with a through-hole designed to accept said fastening means.

2. The device as claimed in claim 1, the fastening means of which consists of a screw.

3. The device as claimed in claim 1, the fastening means of which consists of two screws.

4. The device as claimed in claim 1, comprising a layer of elastomeric material between the downstream edge of the platform and the bottom of said slot.

5. A bypass turbojet engine with upstream fan comprising a set of stator vanes which straighten the stream downstream of the fan rotor and the vanes of which are held inside the fan casing by a device as claimed in claim 1.

6. The turbojet engine as claimed in claim 5, the vanes of which are positioned between the fan casing and the main stream casing, the root of the vanes being engaged with clearance in openings formed in said main stream casing and a seal being used to fill said clearance.

7. The turbojet engine as claimed in claim 5, in which the vanes and the main stream casing are made of a metal or of a composite.

8. A method of mounting a stator vane in a turbojet engine as claimed in claim 5, whereby the vane is engaged via the root in said opening, the vane is tilted in such a way as to engage the downstream edge of the platform in the downstream slot of the circumferential groove, the vane is pivoted about the slot, returning the vane upstream until the upstream edge of the platform enters the groove, and the platform is secured to the casing using the fastening means.

9. The method as claimed in claim 8, whereby the seal is fitted around the airfoil near the root beforehand.

10. The method as claimed in claim 8, whereby a layer of elastomeric material is positioned between the downstream edge of the platform and the bottom of the slot.

* * * * *